United States Patent
Maier

(10) Patent No.: US 10,044,007 B2
(45) Date of Patent: Aug. 7, 2018

(54) OFFSET VEHICLE CRASH ELEMENTS

(71) Applicant: Thunder Power New Energy Vehicle Development Company Limited, Central (HK)

(72) Inventor: Jens Maier, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/838,861

(22) Filed: Dec. 12, 2017

(65) Prior Publication Data

US 2018/0102515 A1 Apr. 12, 2018

Related U.S. Application Data

(62) Division of application No. 15/690,854, filed on Aug. 30, 2017.

(Continued)

(51) Int. Cl.
*H01M 2/04* (2006.01)
*H01M 2/10* (2006.01)
(Continued)

(52) U.S. Cl.
CPC .......... *H01M 2/043* (2013.01); *H01M 2/024* (2013.01); *H01M 2/1077* (2013.01);
(Continued)

(58) Field of Classification Search
CPC ... B60L 11/18; B60L 11/1803–11/1807; B60L 11/1851; B60L 11/1877–11/1879; H01M 2/10–2/1094
See application file for complete search history.

(56) References Cited

U.S. PATENT DOCUMENTS 2,728,479 A * 12/1955 Wheeler ............... B65D 65/44
156/197
4,227,593 A * 10/1980 Bricmont ............... F16F 7/121
188/377
(Continued)

FOREIGN PATENT DOCUMENTS

DE 10 2010 024320 A1 12/2011
DE 10 2011 102412 A1 11/2012
(Continued)

OTHER PUBLICATIONS

European Search Report for EP 17189806 dated Feb. 26, 2018, 8 pages.
(Continued)

*Primary Examiner* — Jonathan Crepeau
*Assistant Examiner* — Jacob Buchanan
(74) *Attorney, Agent, or Firm* — Kilpatrick Townsend & Stockton LLP

(57) ABSTRACT

A crash elements structure in an electric vehicle for reducing the damage to a vehicle battery caused by a vehicle collision. The crash elements structure may be situated near a corner of the vehicle battery, and may channel energy received by the vehicle away from the vehicle battery. The crash elements structure includes an upper structure positioned above and laterally offset from a lower structure, and a "W" structure that interfaces between the vehicle battery and the upper and lower structures. The upper and lower structures include several shells coupled together to form hexagonal apertures. The specific arrangement of the shells and the upper and lower structures influences the transfer of energy through the crash elements structure in the event of a collision.

5 Claims, 8 Drawing Sheets

Related U.S. Application Data

(60) Provisional application No. 62/384,298, filed on Sep. 7, 2016.

(51) Int. Cl.
  *B60L 11/18* (2006.01)
  *H01M 2/02* (2006.01)

(52) U.S. Cl.
  CPC ........ *B60L 11/1879* (2013.01); *B60Y 2200/91* (2013.01); *B60Y 2306/01* (2013.01); *H01M 2220/20* (2013.01)

(56) References Cited

U.S. PATENT DOCUMENTS

| | | | | |
|---|---|---|---|---|
| 4,566,237 | A * | 1/1986 | Turner | E04H 9/10 |
| | | | | 109/1 S |
| 5,175,041 | A * | 12/1992 | Webb | B65D 65/44 |
| | | | | 206/586 |
| 6,372,322 | B1 * | 4/2002 | Devaguptapu | B32B 3/12 |
| | | | | 156/197 |
| 6,540,275 | B1 * | 4/2003 | Iwamoto | B60R 19/12 |
| | | | | 293/109 |
| 2010/0109353 | A1 * | 5/2010 | Allen | B60R 19/18 |
| | | | | 293/120 |
| 2012/0021301 | A1 | 1/2012 | Ohashi | |
| 2012/0103714 | A1 * | 5/2012 | Choi | B60K 1/04 |
| | | | | 180/68.5 |
| 2012/0112479 | A1 * | 5/2012 | Nagwanshi | B60R 19/34 |
| | | | | 293/133 |
| 2016/0167544 | A1 * | 6/2016 | Barbat | B60K 1/04 |
| | | | | 180/68.5 |
| 2016/0229308 | A1 | 8/2016 | Nusier et al. | |
| 2016/0233467 | A1 * | 8/2016 | Nusier | H01M 2/1083 |

FOREIGN PATENT DOCUMENTS

| | | |
|---|---|---|
| DE | 10 2013 102502 A1 | 9/2014 |
| DE | 10 2014 107388 A1 | 11/2015 |

OTHER PUBLICATIONS

U.S. Appl. No. 15/690,854 Non-Final Rejection dated Feb. 12, 2018, all pages.

Notice of Allowance dated Apr. 9, 2018 in the corresponding U.S. Appl. No. 15/690,854.

* cited by examiner

OFFSET VEHICLE CRASH ELEMENTS

CROSS-REFERENCE TO RELATED APPLICATION

The present application is a divisional of U.S. Nonprovisional application Ser. No. 15/690,854, filed Aug. 30, 2017, which claims priority to U.S. Provisional Application No. 62/384,298, filed Sep. 7, 2016, which are hereby incorporated by reference in their entirety for all purposes.

BACKGROUND OF THE INVENTION

Vehicle manufacturers have added a number of new structural features to vehicles to improve safety and/or performance. Many of these structural features are applicable to electric, hybrid, and non-electric vehicles equally, while others place a greater emphasis on the vehicle motor type, such as a vehicle base plate with increased thickness for protecting an electric car battery over a specific region of the vehicle. Structural improvements that increase either safety or performance without a significant compromise of the other remain important objectives of vehicle manufacturers.

Electric vehicles are becoming an increasingly viable alternative to traditional vehicles with internal combustion engines. Electric vehicles may have advantages in their compactness, simplicity of design, and in being potentially more environmentally friendly depending on the means by which the electricity used in the vehicle was originally generated. The prospect of using renewable energy sources to power automobiles in place of gasoline has obvious advantages as oil reserves across the globe become increasingly depleted.

BRIEF SUMMARY OF THE INVENTION

In a first embodiment of the present disclosure, an electric vehicle is provided. The electric vehicle may include a vehicle battery for powering the electric vehicle. The vehicle battery may include a battery top surface and a battery side surface. The battery top surface and the battery side surface may form an angle along a battery corner of the vehicle battery. The electric vehicle may include a crash elements structure. The crash elements structure may include an upper structure including a first upper shell coupled vertically above a first lower shell such that a first set of apertures are formed between the first upper shell and the first lower shell. The upper structure may be coupled vertically above the battery top surface. The crash elements structure may include a lower structure including a second upper shell coupled vertically above a second lower shell such that a second set of apertures are formed between the second upper shell and the second lower shell. The lower structure may be coupled laterally to the side of the battery side surface and vertically below the upper structure.

In some embodiments, each of the first set of apertures and each the second set of apertures may be hexagonal. In some embodiments, the crash elements structure may include a first set of covers coupled laterally to the side of the first set of apertures and a second set of covers coupled laterally to the side of the second set of apertures. In some embodiments, the upper structure may be vertically symmetrical such that the first upper shell and the first lower shell are identical in shape and size. In some embodiments, the lower structure may be vertically symmetrical such that the second upper shell and the second lower shell are identical in shape and size. In some embodiments, each of the first upper shell, first lower shell, second upper shell, and second lower shell may include a plurality of planar surfaces coupled in series. In some embodiments, at least two of the plurality of planar surfaces of the first upper shell may be directly coupled vertically above at least two of the plurality of planar surfaces of the first lower shell. In some embodiments, at least two of the plurality of planar surfaces of the second upper shell may be directly coupled vertically above at least two of the plurality of planar surfaces of the second lower shell.

In some embodiments, the crash elements structure may include a "W" structure. The "W" structure may include a first side being substantially vertical and coupling laterally to the side of the upper structure. The "W" structure may include a second side being substantially horizontal and coupling vertically below the upper structure and vertically above the battery top surface. The "W" structure may include a third side being substantially vertical and coupling laterally to the side of the battery side surface and laterally to the side of the lower structure. The "W" structure may include a fourth side being substantially horizontal and coupling vertically below the lower structure. In some embodiments, a gap of at least 5 mm may exist between the third side of the "W" structure and the battery side surface. In some embodiments, the crash elements structure is made of carbon fiber.

In a second embodiment of the present disclosure, a crash elements structure for an electric vehicle powered by a vehicle battery is provided. The crash elements structure may include an upper structure including a first upper shell coupled vertically above a first lower shell such that a first set of apertures are formed between the first upper shell and the first lower shell. The upper structure may be coupled vertically above a battery top surface. The crash elements structure may include a lower structure including a second upper shell coupled vertically above a second lower shell such that a second set of apertures are formed between the second upper shell and the second lower shell. The lower structure may be coupled laterally to the side of a battery side surface and vertically below the upper structure. The battery top surface and the battery side surface may form an angle along a battery corner of the vehicle battery.

In some embodiments, each of the first set of apertures and each the second set of apertures may be hexagonal. In some embodiments, the crash elements structure may include a first set of covers coupled laterally to the side of the first set of apertures and a second set of covers coupled laterally to the side of the second set of apertures. In some embodiments, the upper structure may be vertically symmetrical such that the first upper shell and the first lower shell are identical in shape and size. In some embodiments, the lower structure may be vertically symmetrical such that the second upper shell and the second lower shell are identical in shape and size. In some embodiments, each of the first upper shell, first lower shell, second upper shell, and second lower shell may include a plurality of planar surfaces coupled in series. In some embodiments, at least two of the plurality of planar surfaces of the first upper shell may be directly coupled vertically above at least two of the plurality of planar surfaces of the first lower shell. In some embodiments, at least two of the plurality of planar surfaces of the second upper shell may be directly coupled vertically above at least two of the plurality of planar surfaces of the second lower shell.

In some embodiments, the crash elements structure may include a "W" structure. The "W" structure may include a first side being substantially vertical and coupling laterally to the side of the upper structure. The "W" structure may include a second side being substantially horizontal and coupling vertically below the upper structure and vertically above the battery top surface. The "W" structure may include a third side being substantially vertical and coupling laterally to the side of the battery side surface and laterally to the side of the lower structure. The "W" structure may include a fourth side being substantially horizontal and coupling vertically below the lower structure. In some embodiments, a gap of at least 5 mm may exist between the third side of the "W" structure and the battery side surface. In some embodiments, the crash elements structure is made of carbon fiber.

In a third embodiment of the present disclosure, a method for receiving an impact force related to a vehicle collision is provided. The method may include receiving, by the lower structure, a first force related to the impact force. The method may include receiving, by the upper structure, a second force related to the impact force. The method may include transferring a first portion of the first force received by the lower structure to the "W" structure. The method may include transferring a second portion of the second force received by the upper structure to the "W" structure. The method may include transferring a third portion of the force received by the "W" structure to a support structure coupled vertically above the battery top surface and laterally to the side of the upper structure.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
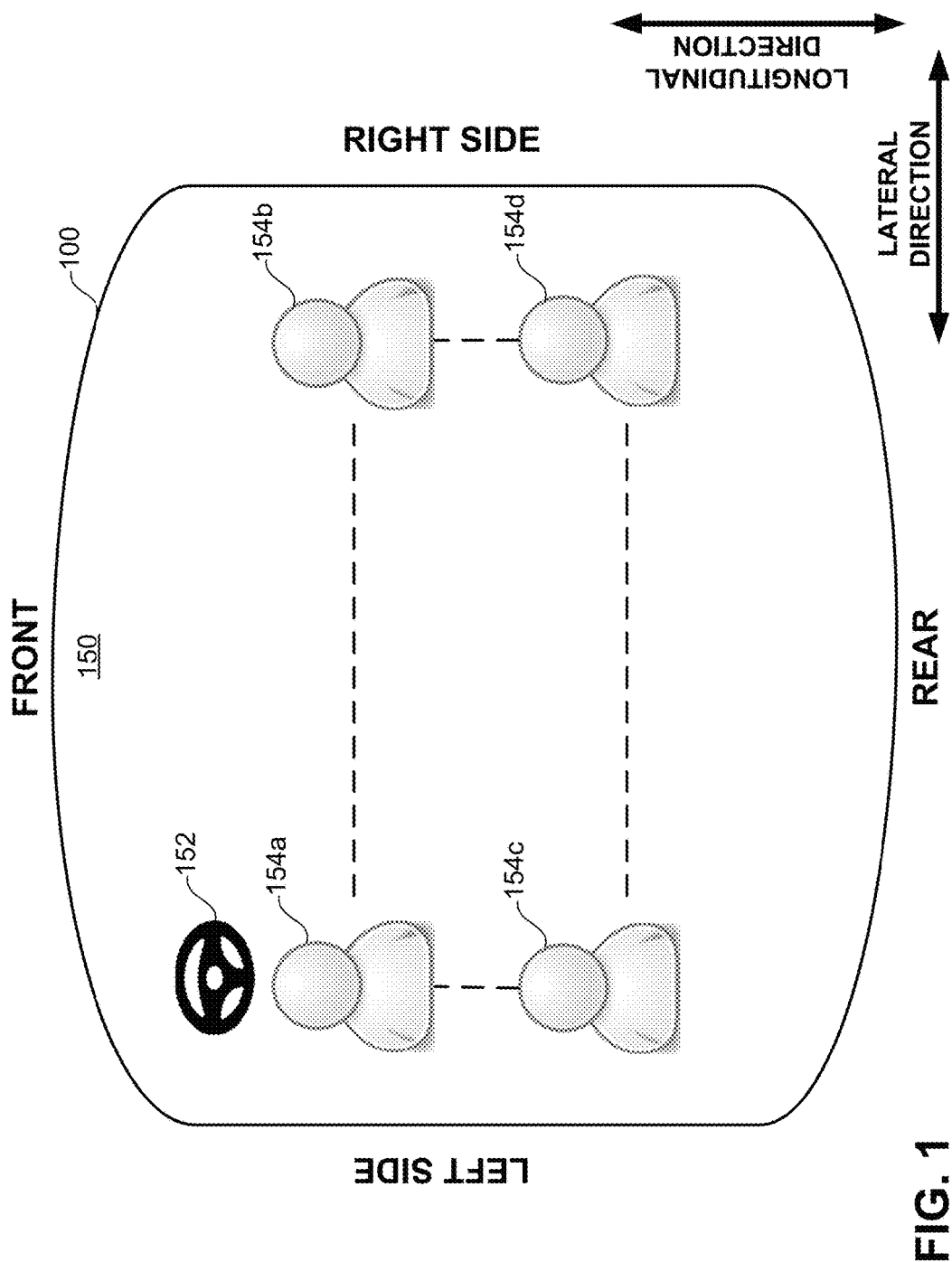
FIG. 1 illustrates a generalized transportation apparatus, according to an embodiment of the present disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Embodiments of the present disclosure relate to a structure situated in an electric vehicle for reducing the effects of a vehicle collision. Specifically, the structure may be situated near a vehicle battery to reduce damage to it. This structure may be referred to herein as a crash elements structure. Safety benefits of the crash elements structure include, but are not limited to: (1) increased protection and accommodation of the vehicle battery and (2) increased efficiency of transfer and absorption of energy/force stemming from a front, side, or angled impact to the vehicle's body structure, lessening the potential impact applied to the vehicle battery. In electric vehicles, an increased emphasis is placed on protection of the electric battery as damage to battery cells can cause explosion and fires within the vehicle. The problem is compounded due to the large amount of space batteries must occupy within electric vehicles in order to maintain practical driving ranges. Therefore, vehicle alterations that provide increased protection along edges and corners of the vehicle battery are advantageous.

In some embodiments, the crash elements structure includes an upper structure positioned above and laterally offset from a lower structure. From a front perspective, the upper and lower structures have a trapezoidal shape that widens toward the center of the vehicle. The upper and lower structures include several shells coupled together to form hexagonal apertures. The specific arrangement of the shells in conjunction with the arrangement of the upper and lower structures can improve the transfer of energy through the crash elements structure in the event of a collision.

In some embodiments, the crash elements structure includes a "W" structure that interfaces between the vehicle battery and the upper and lower structures. In the event of a collision, the "W" structure may receive energy from the upper and lower structures and transfer a portion of that energy to a support structure situated above the vehicle battery. The "W" structure may be tightly coupled with the battery corner or may be positioned such that a horizontal gap exists between the "W" structure and the battery side surface. Simulation results disclosed herein demonstrate an improvement in functionality of the crash elements structure when the "W" structure is positioned such that the gap is present. In addition to the "W" structure, the crash elements structure may include three different "S" structures to further improve functionality.

FIG. 1 illustrates a generalized transportation apparatus 100, according to an embodiment of the present disclosure. Transportation apparatus 100 may include any apparatus that moves in distance. Examples of transportation apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a helicopter, a spaceship, or any other type of aircraft; or may include any other transportation apparatus. In some embodiments, transportation apparatus 100 is an electrical automobile. As shown, transportation apparatus 100 may include a cabin 150 with a volume.

As shown in FIG. 1, transportation apparatus 100 may comprise one or more steering wheels 152 in cabin 150. Although only one steering wheel 152 is shown in FIG. 1, this is not intended to be limiting. In some examples, transportation apparatus 100 may include more than one steering wheel 152. For example, it is contemplated that transportation apparatus 100 may be an aircraft that comprises at least a main steering wheel 152 for the main pilot and at least a secondary steering wheel 152 for a co-pilot.

As also shown in FIG. 1, one or more users 154 may be arranged to occupy their corresponding positions in cabin 150. Users 154 may include one or more drivers that control the movement or navigation of transportation apparatus 100, one or more passengers, and/or any other type of users 154. In this example, user 154a is a driver that controls the driving of transportation apparatus 100, while other users 154, e.g., users 154b-d, are passengers. As still shown, there may be multiple rows of users 154 within cabin 150 of transportation apparatus 100.

Figure 2:
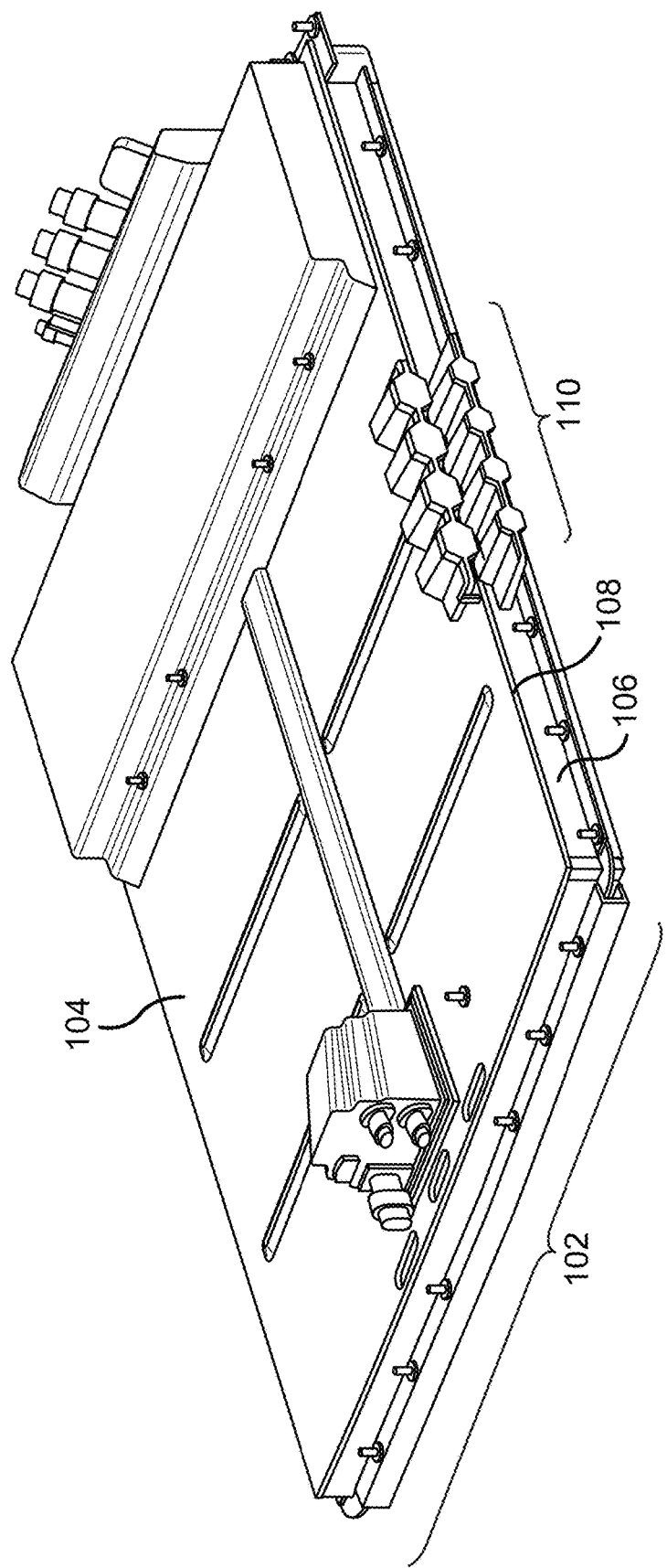
FIG. 2 illustrates a perspective view of a vehicle battery and a crash elements structure, according to an embodiment of the present disclosure.

FIG. 2 illustrates a perspective view of a vehicle battery 102 coupled with a crash elements structure 110, according to an embodiment of the present disclosure. Although the crash elements structure 110 is shown in FIG. 2 as being situated in an electric vehicle, in other embodiments the crash elements structure 110 may be implemented in any of the transportation apparatus described in reference to FIG. 1. In some embodiments, the vehicle battery 102 may include a battery top surface 104 and a battery side surface 106 that may be considered as being integrated with the vehicle battery 102, or may be considered as being separate components. For example, the battery top surface 104 and the battery side surface 106 may be composed of a durable material such as aluminum or steel. The battery top surface 104 and the battery side surface 106 may form an angle along a battery corner 108. The angle formed may be 75 degrees, 90 degrees, 105 degrees, and the like. The crash elements structure 110 may be positioned at the battery corner 108 such that the crash elements structure 110 encompasses the battery corner 108 over a length of the vehicle battery 102 in the longitudinal direction. As will be described, the crash elements structure 110 may be coupled directly to or indirectly to the battery top surface 104 and the battery side surface 106.

Figure 3:
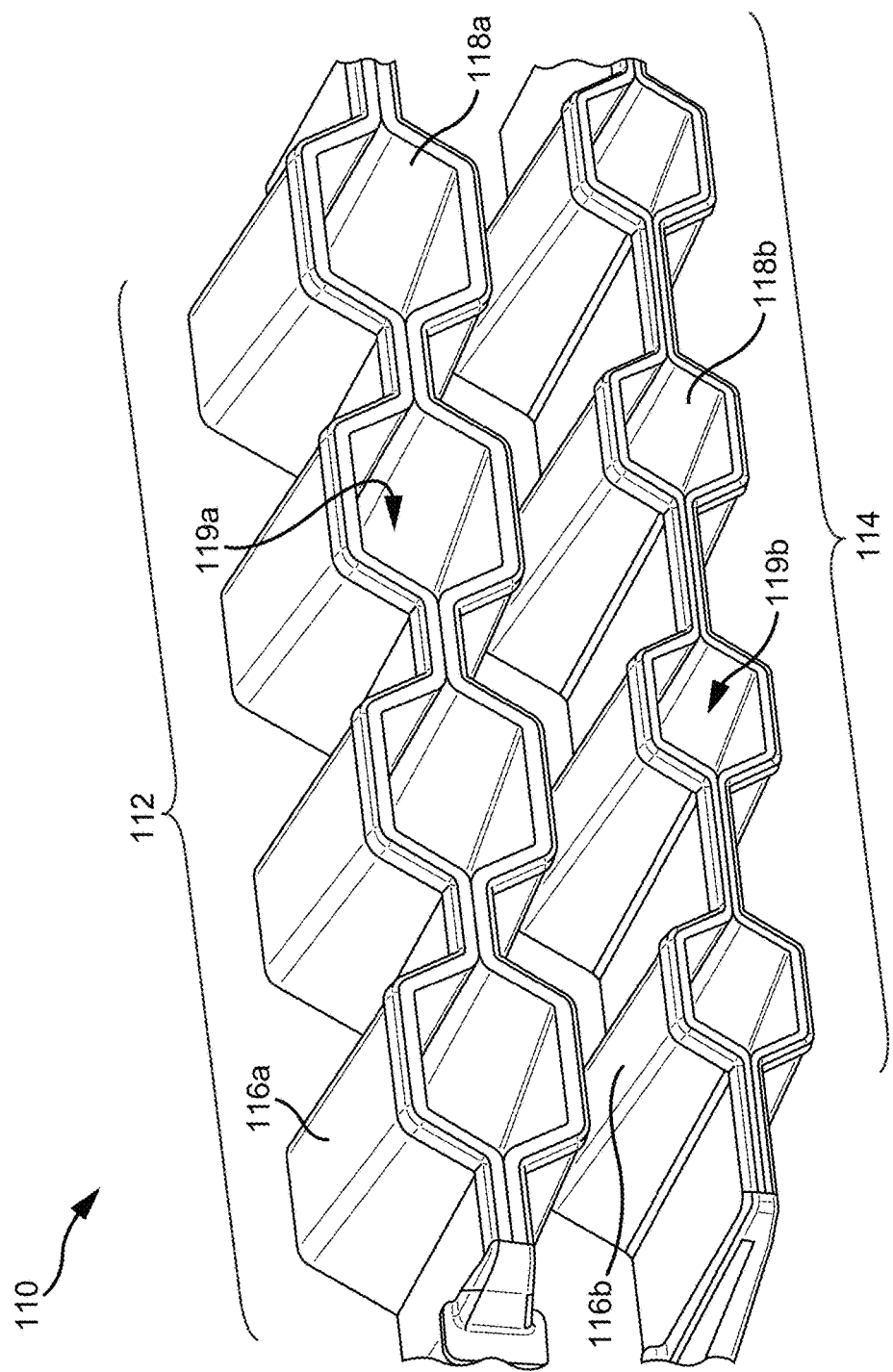
FIG. 3 illustrates a perspective view of a crash elements structure, according to an embodiment of the present disclosure.

FIG. 3 illustrates a perspective view of the crash elements structure 110, according to an embodiment of the present disclosure. The crash elements structure 110 may include an upper structure 112 and a lower structure 114. The upper structure 112 may include an upper shell 116a coupled vertically above a lower shell 118a. The upper shell 116a and the lower shell 118a may be vertically symmetrical such that they are identical in shape and size and are vertically flipped versions of each other. The upper shell 116a and the lower shell 118a may each include a plurality of planar surfaces coupled in series. Some of the planar surfaces of the upper shell 116a may be directly coupled vertically above some of the planar surfaces of the lower shell 118a such that a set of apertures 119a are formed between the upper shell 116a and the lower shell 118a. The set of apertures 119a may be hexagonal (as shown in FIG. 3), or may be some other shape.

Similar to the upper structure 112, in some embodiments the lower structure 114 may include an upper shell 116b coupled vertically above a lower shell 118b. The upper shell 116b and the lower shell 118b may be vertically symmetrical such that they are identical in shape and size and are vertically flipped versions of each other. The upper shell 116b and the lower shell 118b may each include a plurality of planar surfaces coupled in series. Some of the planar surfaces of the upper shell 116b may be directly coupled vertically above some of the planar surfaces of the lower shell 118b such that a set of apertures 119b are formed between the upper shell 116b and the lower shell 118b. The set of apertures 119b may be hexagonal (as shown in FIG. 3), or may be some other shape.

In some embodiments, the upper structure 112 may be longer in the vertical direction, shorter in the lateral direction and may have the same length in the longitudinal direction as the lower structure 114. The lengths of the structures may be constrained in the longitudinal direction due to various features of the vehicle, such as the front door, the rear door, the wheel well, among others. The length of the upper structure 112 may be greater in the vertical direction due to the relatively low position of the vehicle battery 102 within the electric vehicle 100. The length of the lower structure 114 may be greater in the lateral direction to increase the energy absorption capacity of the lower structure 114 in the event of a collision. In some embodiments, the shapes of the structures may be further modified from that shown in FIG. 3 to improve energy transfer and absorption.

Figure 4:
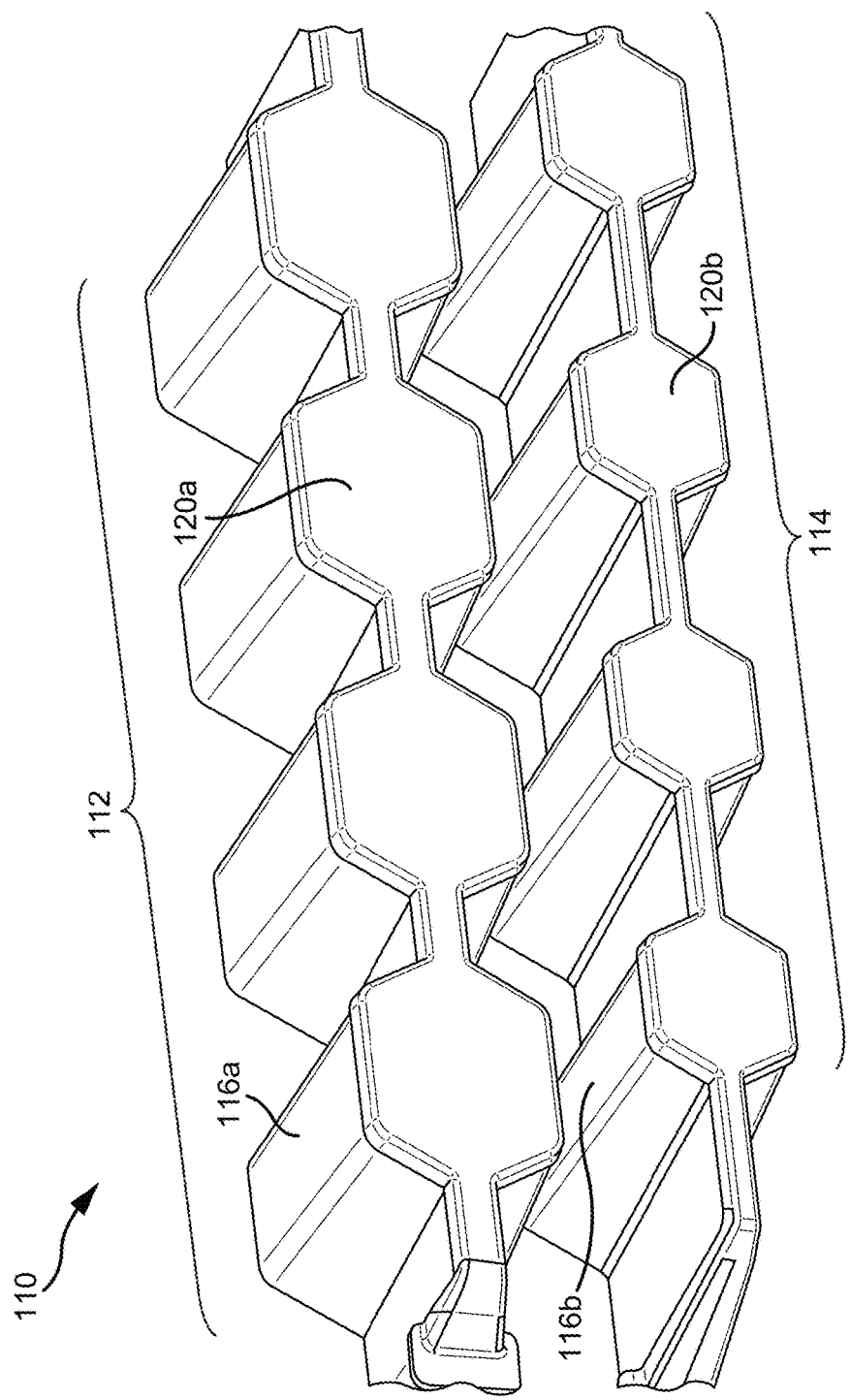
FIG. 4 illustrates a perspective view of a crash elements structure, according to an embodiment of the present disclosure.

FIG. 4 illustrates a perspective view of the crash elements structure 110, according to an embodiment of the present disclosure. In some embodiments, a set of covers 120a are coupled laterally to the side of the set of apertures 119a, and a set of covers 120b are coupled laterally to the side of the set of apertures 119b. The set of covers 120 may be coupled to the set of apertures 119 by coupling to the edges of the upper shells 116 and the lower shells 118. One purpose of the set of covers 120 is to more evenly distribute an incoming force across the upper shells 116 and the lower shells 118 of the crash elements structure 110.

Figure 5:
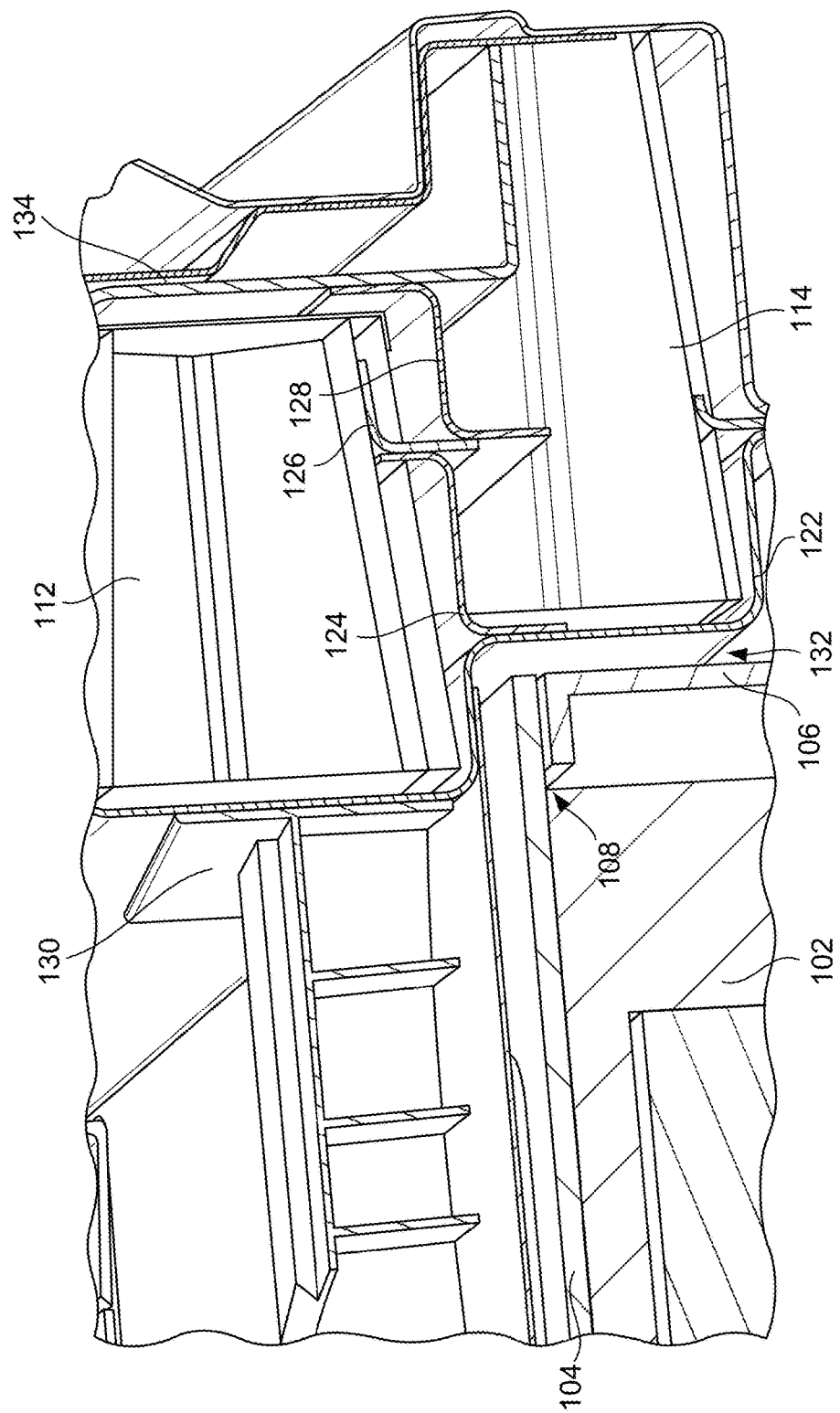
FIG. 5 illustrates a perspective view of a vehicle battery and a crash elements structure, according to an embodiment of the present disclosure.
Figure 6:
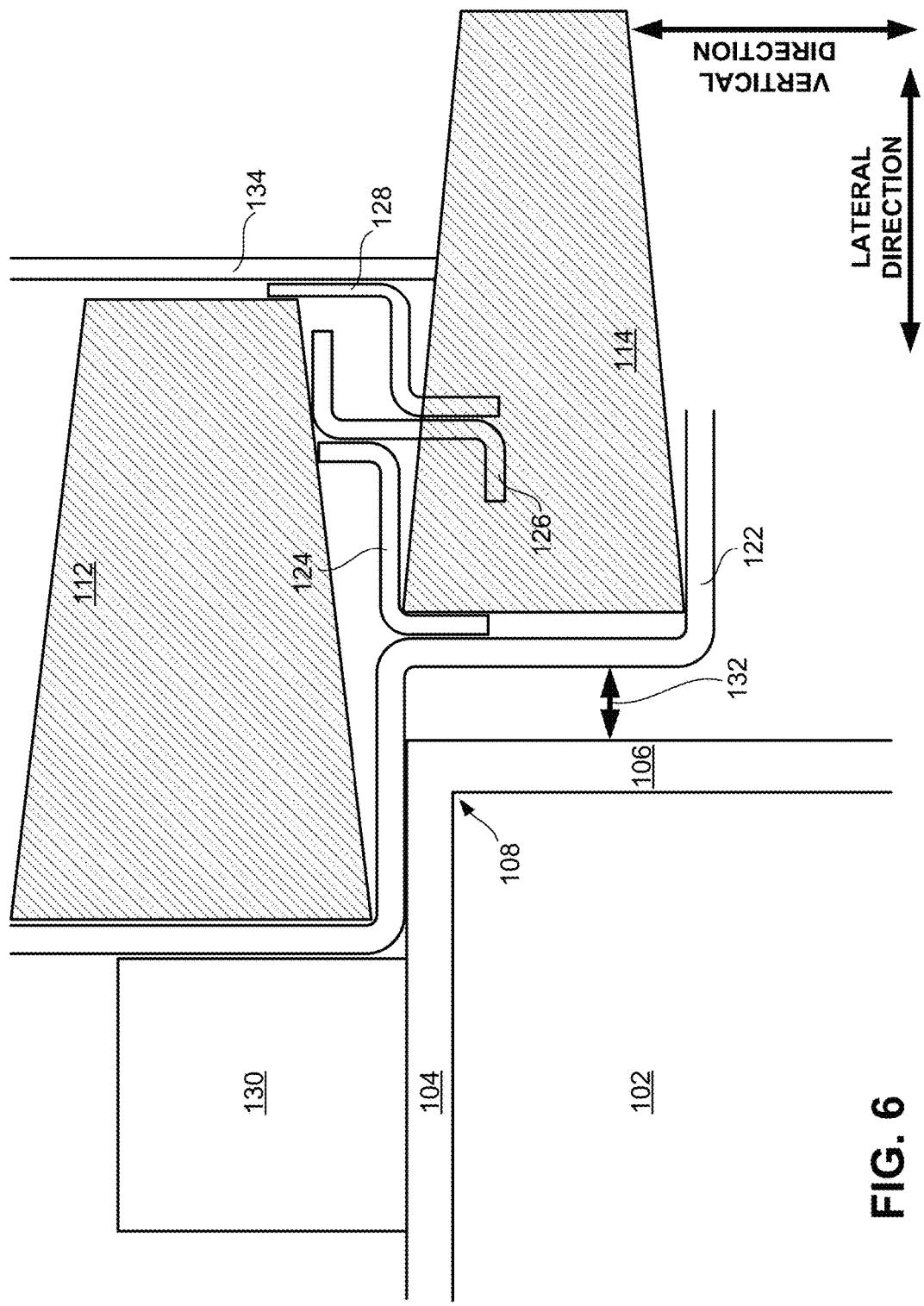
FIG. 6 illustrates a front view of a vehicle battery and a crash elements structure, according to an embodiment of the present disclosure.

FIG. 5 illustrates a perspective view and FIG. 6 illustrates a front view of the vehicle battery 102 and the crash elements structure 110, according to an embodiment of the present disclosure. From the side view, the upper structure 112 and the lower structure 114 have a trapezoidal shape that widens on the sides closer to the vehicle battery 102. The upper structure 112 may be laterally offset from the lower structure 114 from anywhere between 0% to 100%, 0% corresponding to the upper structure 112 being completely vertically above the lower structure 114 and 100% corresponding to all of the upper structure 112 being closer laterally to the vehicle battery 102 than any part of the lower structure 114. In the embodiment shown in FIG. 5, the upper structure 112 is approximately 30% laterally offset from the lower structure 114. In the embodiment shown in FIG. 6, the upper structure 112 is approximately 50% laterally offset from the lower structure 114. In some embodiments, the crash elements structure 110 has a desired performance in a range of approximately 20%-60%.

In some embodiments, the crash elements structure 110 includes a "W" structure 122 that interfaces between the vehicle battery 102, the upper structure 112, and the lower structure 114. One purpose of the "W" structure 122 is to channel the energy received by the upper structure 112 and the lower structure 114 away from the vehicle battery 102 and toward a support structure 130 positioned above the vehicle battery 102. The support structure 130 may be coupled vertically above the battery top surface 104 and laterally to the side of the "W" structure 122 as shown in FIGS. 5 and 6. The support structure 130 is ideally a component with a large energy absorption capacity. The support structure 130 may be coupled with additional components within the electric vehicle 100, such as the vehicle's body structure, so that energy is channeled away from the electric battery 102.

In some embodiments, the "W" structure 122 includes at least four sides. A first side of the "W" structure 122 may be substantially vertical and may couple laterally to the side of the upper structure 112 and laterally to the side of the support structure 130. A second side of the "W" structure 122 may be substantially horizontal and may couple vertically below the upper structure 112 and vertically above the battery top surface 104. A third side of the "W" structure 122 may be substantially vertical and may couple laterally to the side of the lower structure 114 and laterally to the side of the battery side surface 106. A fourth side of the "W" structure 122 may be substantially horizontal and may couple vertically below the lower structure 114. The first, second, third, and fourth sides of the "W" structure 122 may be planar and may form 90 degree angles with respect to each other.

In some embodiments, a gap 132 is positioned between the third side of the "W" structure 122 and the battery side surface 106. The gap 132 may be an air gap or may be filled with material as long as the filled material is weaker than the material of the "W" structure 122, i.e., the material of the gap 132 is collapsible at a lower force than the material of the "W" structure 122. The gap 132 may be 1 mm, 2 mm, 5 mm, 10 mm, and the like. One purpose of the gap 132 is to allow the "W" structure 122 to channel energy away from the vehicle battery 102 and toward the support structure 130. Simulation results (shown in FIG. 7) demonstrate that the crash elements structure 110 has an improved performance when the gap 132 is 5 mm.

In some embodiments, additional components and structures may be added to the crash elements structure 110 to improve its performance. For example, in some embodiments, the crash elements structure 110 may include a first "S" structure 124, a second "S" structure 126, and a third "S" structure 128 for channeling energy away from the vehicle battery 102. The first "S" structure 124 may couple laterally to the side of the "W" structure 122, laterally to the side of the lower structure 114, vertically above the lower structure 114, vertically below the upper structure 112, and laterally to the side of the second "S" structure 126. The second "S" structure 126 may couple laterally to the side of the first "S" structure 124, vertically above the lower structure 114, vertically below the upper structure 112, and laterally to the side of the third "S" structure 128. The third "S" structure 128 may couple laterally to the side of the second "S" structure 126, vertically above the lower structure 114, laterally to the side of the upper structure 112, and laterally to the side of a vehicle side 134.

In some embodiments, the second "S" structure 126 and the third "S" structure 128 may couple vertically above a concave portion of the upper shell 116b of the lower structure 114. This is illustrated in FIG. 6 by the overlapped portions of the second "S" structure 126 with the lower structure 114 and of the third "S" structure 128 with the lower structure 114. In contrast, in some embodiments, the first "S" structure 124 and the second "S" structure 126 may couple vertically below a convex portion of the lower shell 118a of the upper structure 112. The "S" structures provide several benefits to the functionality of the crash elements structure 110. First, the "S" structures may provide lateral containment of the upper structure 112 (between the "W" structure 122 and the third "S" structure 128) which reduces the amount of torque applied to the "W" structure in the event of a collision and instead provides a more linear transfer of energy to the support structure 130. Second, the "S" structures redistribute energy from the lower structure 114 to the upper structure 112 by "grappling" the upper structure 112 via the third "S" structure 128. Third, the "S" structures may be made from a more durable material than the upper structure 112 and the lower structure 114, such as steel or aluminum, which may cause an impact force applied to the vehicle side 134 to initially bypass the upper structure 112 and travel through the "S" structures and the "W" structure 122 to the support structure 130. Initially bypassing the upper structure 112 may be beneficial because the support structure 130 may have superior energy absorption properties.

Figure 7:
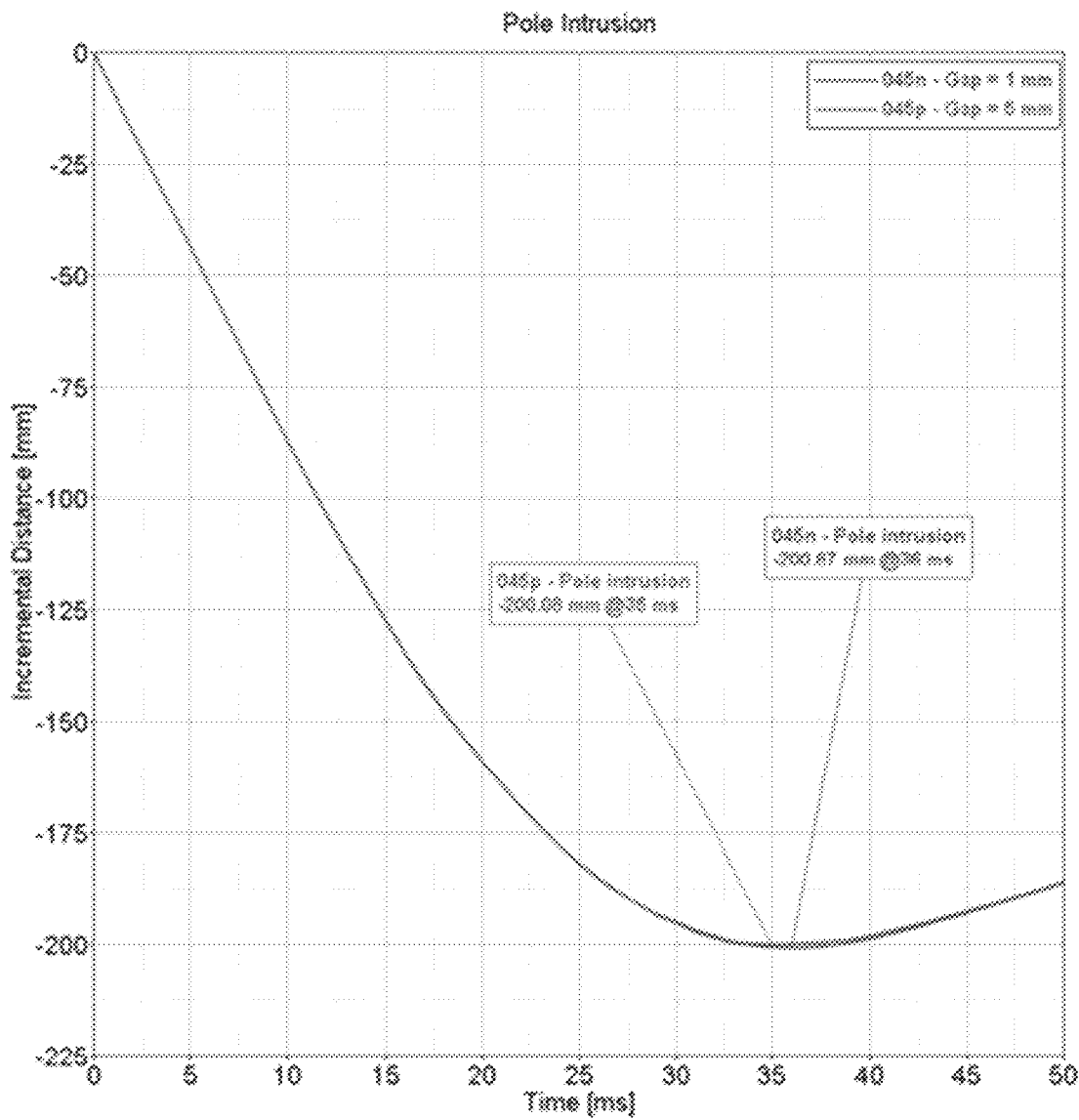
FIG. 7 illustrates simulation results of an electric vehicle with a crash elements structure, according to an embodiment of the present disclosure.

FIG. 7 illustrates simulation results for the electric vehicle 100 with the crash elements structure 110, according to an embodiment of the present disclosure. The simulation results show the incremental distance traveled by a pole into the electric vehicle 100 during a side impact. The crash elements structure 110 was modeled using 1 mm and 5 mm for the gap 132. The lesser amount of pole intrusion using a 5 mm gap indicates that the crash elements structure 110 has an improved performance when the gap 132 is 5 mm.

Figure 8:
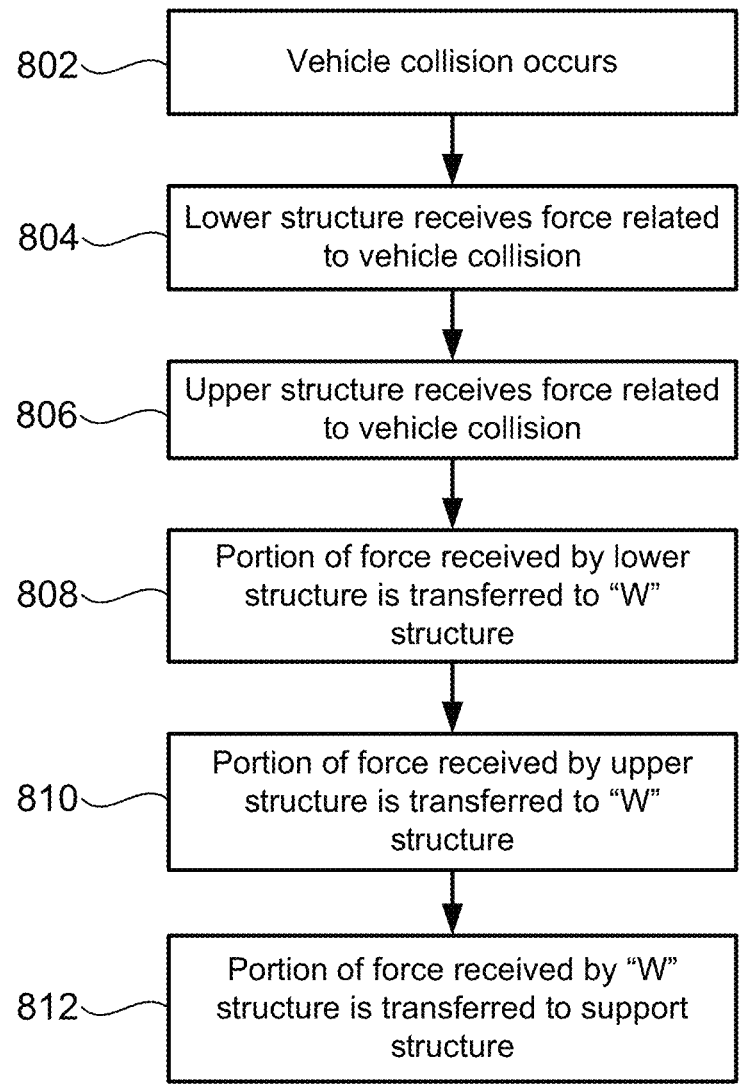
FIG. 8 illustrates a method for receiving an impact force related to a vehicle collision, according to an embodiment of the present disclosure.

FIG. 8 illustrates a method 800 for receiving an impact force related to a vehicle collision, according to an embodiment of the present disclosure. At step 802, a vehicle collision occurs. The collision may be a head-on (front), side, or angled impact, or an impact from some other direction. At step 804, the lower structure 114 receives a first force related to the impact force. At step 806, the upper structure 112 receives a second force related to the impact force. At step 808, a first portion of the first force received by the lower structure 114 is transferred to the "W" structure 122. At step 810, a second portion of the second force received by the upper structure 112 is transferred to the "W" structure 122. At step 812, a third portion of the force received by the "W" structure 122 is transferred to the support structure 130.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

LIST OF TERMS

100—Electric Vehicle/Transportation Apparatus
102—Vehicle Battery
104—Battery Top Surface
106—Battery Side Surface
108—Battery Corner
110—Crash Elements Structure
112—Upper Structure
114—Lower Structure
116—Upper Shells
116a—Upper Shell (of Upper Structure, i.e., "First Upper Shell")
116b—Upper Shell (of Lower Structure, i.e., "Second Upper Shell")
118—Lower Shells
118a—Lower Shell (of Upper Structure, i.e., "First Lower Shell")
118b—Lower Shell (of Lower Structure, i.e., "Second Lower Shell")
119—Set of Apertures
119a—Set of Apertures (of Upper Structure, i.e., "First Set of Apertures")
119b—Set of Apertures (of Lower Structure, i.e., "Second Set of Apertures")
120—Set of Covers
120a—Set of Covers (of Upper Structure, i.e., "First Set of Covers")
120b—Set of Covers (of Lower Structure, i.e., "Second Set of Covers")
122—"W" Structure
124—First "S" Structure
126—Second "S" Structure
128—Third "S" Structure
130—Support Structure
132—Gap
134—Vehicle Side
150—Cabin
152—Steering Wheel
154—Users

What is claimed is:

1. A method for receiving an impact force related to a vehicle collision, the method comprising:
for an electric vehicle comprising:
a vehicle battery for powering the electric vehicle, the vehicle battery including a battery top surface and a battery side surface, the battery top surface and battery bottom surface forming an angle along a battery corner of the vehicle battery; and
a crash elements structure comprising:
an upper structure including a first upper shell coupled vertically above a first lower shell such that a first set of apertures are formed between the first upper shell and the first lower shell, wherein the upper structure is coupled vertically above the battery top surface;
a lower structure including a second upper shell coupled vertically above a second lower shell such that a second set of apertures are formed between the second upper shell and the second lower shell, wherein the lower structure is coupled laterally to the side of the battery side surface and vertically below the upper structure; and
a "W" structure including:
a first side being substantially vertical and coupling laterally to the side of the upper structure;
a second side being substantially horizontal and coupling vertically below the upper structure and vertically above the battery top surface;
a third side being substantially vertical and coupling laterally to the side of the battery side surface and laterally to the side of the lower structure; and
a fourth side being substantially horizontal and coupling vertically below the lower structure;
receiving, by the lower structure, a first force related to the impact force;
receiving, by the upper structure, a second force related to the impact force;
transferring a first portion of the first force received by the lower structure to the "W" structure;
transferring a second portion of the second force received by the upper structure to the "W" structure; and
transferring a third portion of the force received by the "W" structure to a support structure coupled vertically above the battery top surface and laterally to the side of the upper structure.

2. The method of claim 1, wherein each of the first set of apertures and each the second set of apertures are hexagonal.

3. The method of claim 1, wherein the crash elements structure further comprises a first set of covers coupled laterally to the side of the first set of apertures and a second set of covers coupled laterally to the side of the second set of apertures.

4. The method of claim 1, wherein the upper structure is vertically symmetrical such that the first upper shell and the first lower shell are identical in shape and size, and wherein the lower structure is vertically symmetrical such that the second upper shell and the second lower shell are identical in shape and size.

5. The method of claim 1, wherein a gap of at least 5 mm separates the third side of the "W" structure and the battery side surface.

\* \* \* \* \*